Sept. 29, 1942.   E. KOMENDA   2,297,225
VEHICLE BODY PART AND METHOD OF FORMING SAME
Filed June 14, 1939   4 Sheets-Sheet 3
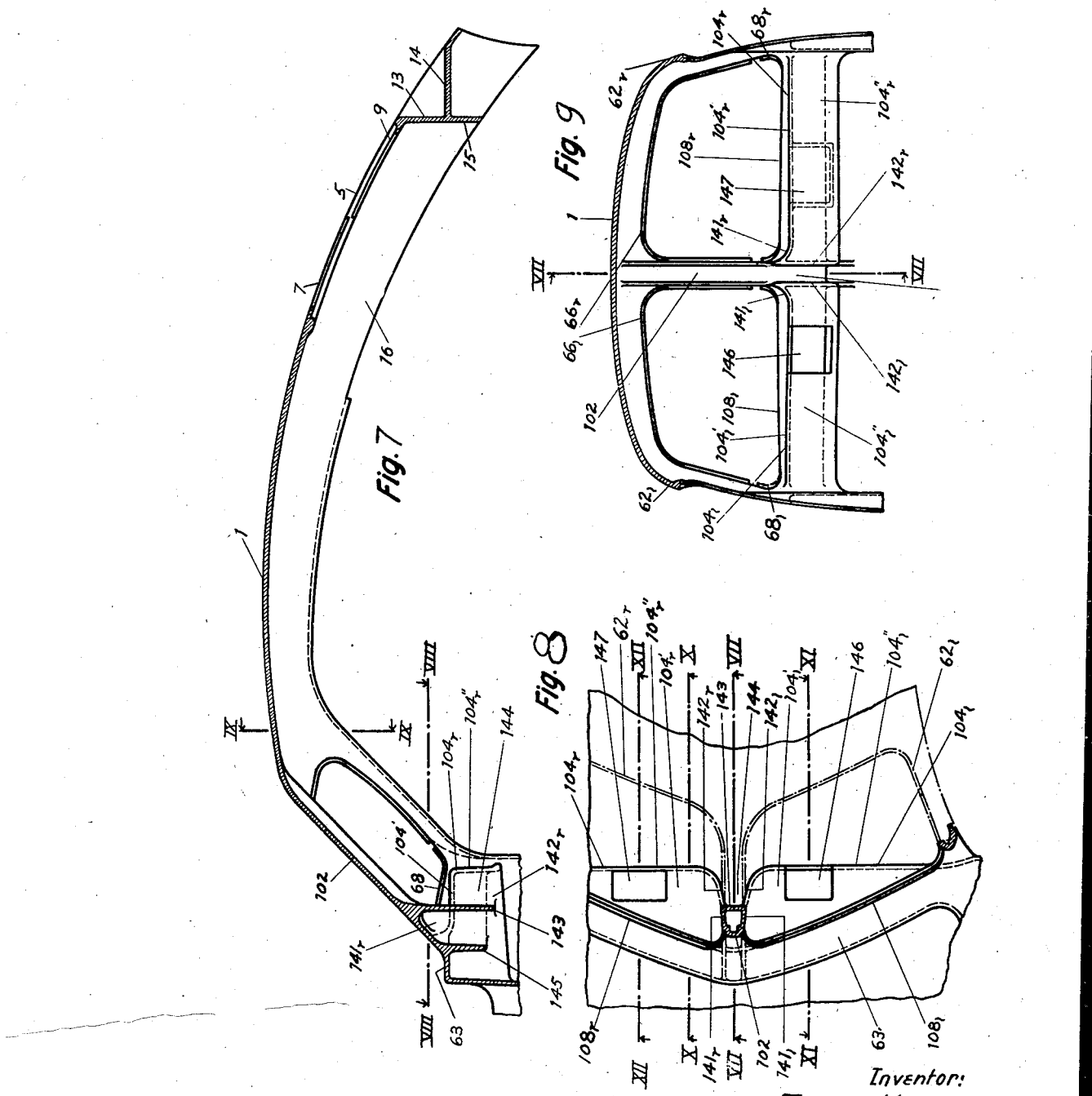
Inventor:
ERWIN KOMENDA
by
Attorneys

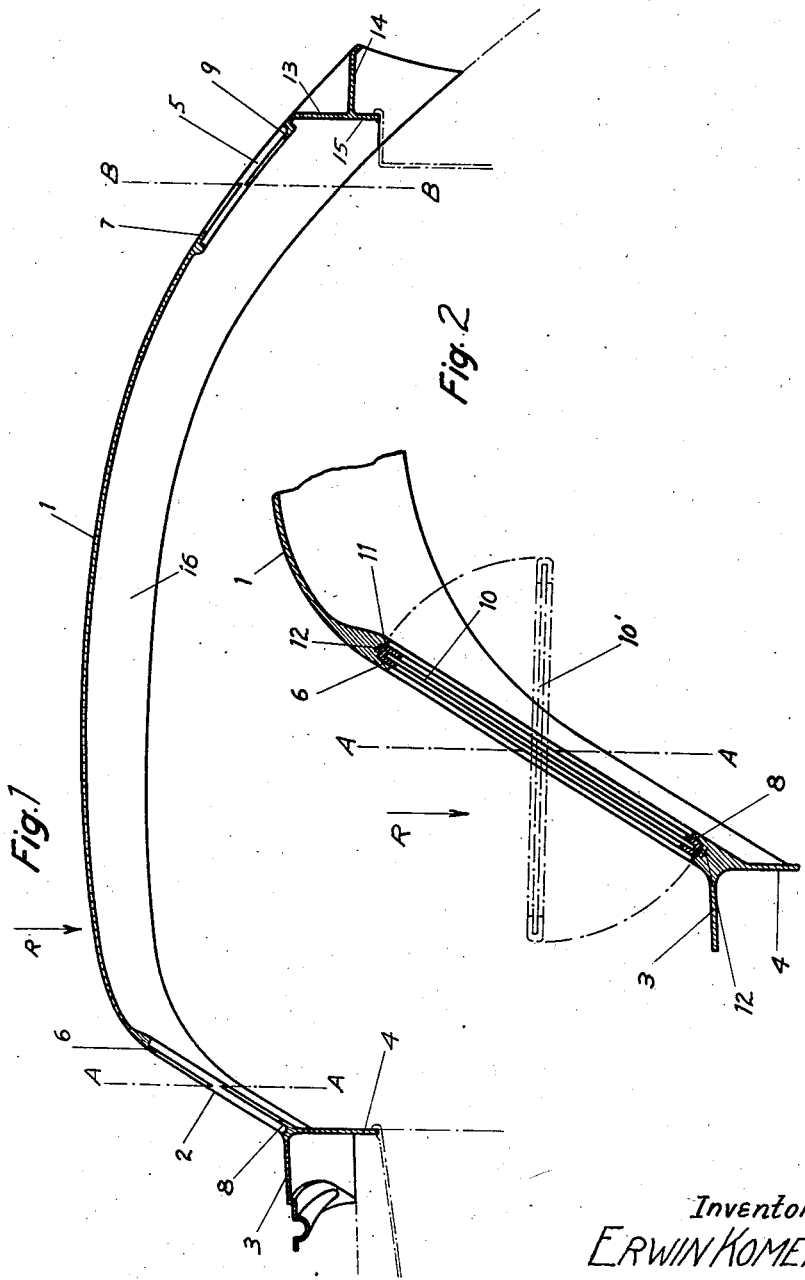

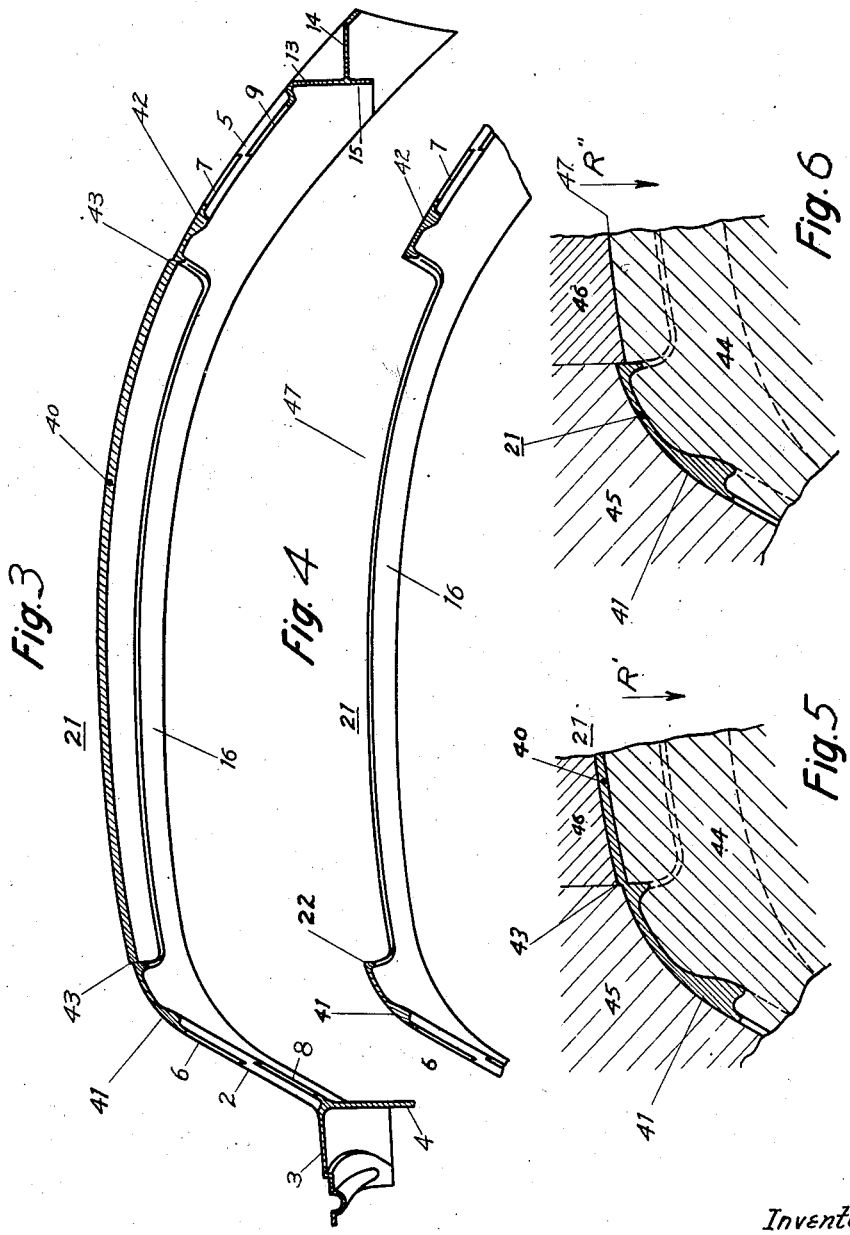

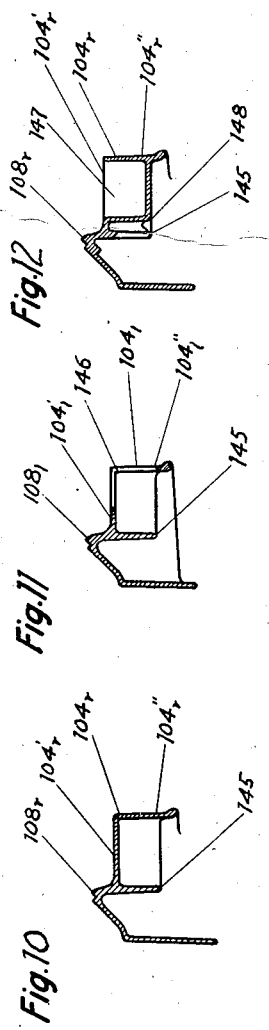
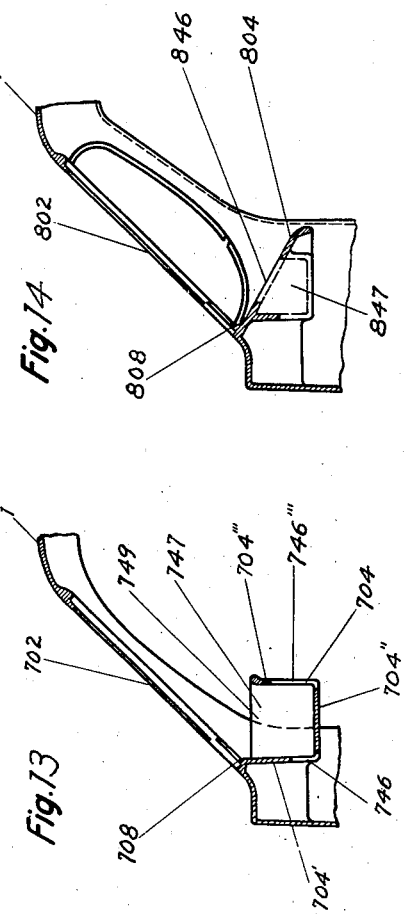

Patented Sept. 29, 1942

2,297,225

UNITED STATES PATENT OFFICE 2,297,225

VEHICLE BODY PART AND METHOD OF FORMING SAME

Erwin Komenda, Korntal-Stuttgart, Germany; vested in the Alien Property Custodian Application June 14, 1939, Serial No. 279,003
In Germany July 2, 1938

16 Claims. (Cl. 296—137)

This invention relates to vehicle body parts and method of forming same, and more particularly to the construction and formation of vehicle body parts of artificial material.

An object of this invention is the production of vehicle body parts of artificial material which possess increased strength and are easy to form.

Another object of this invention is the production of a vehicle roof of artificial material by itself alone or in combination with integral windshield frame, cowl and/or instrument panel parts which possess high rigidity and may be formed on a simple vertically acting press.

A further object of this invention is to form a vehicle roof of artificial material, in combination with an integral windshield frame providing a simple, easily produced arrangement for inserting and holding in place a windshield pane.

An additional object of this invention is the provision of means for forming a solid or open vehicle roof of artificial material by a single, simple, vertically acting press.

A still further object of this invention is to form a vehicle roof of artificial material, in combination with integral windshield frame and instrument panel parts, wherein all of these elements may be cheaply though rigidly formed by a simple vertically acting press which at the same time will form the necessary openings and compartments in the instrument panel.

Further objects and advantages of this invention will be apparent from consideration of the specification as illustrated by the accompanying drawings of possible embodiments of the invention, in which drawings:

Fig. 1 is a central longitudinal cross-section showing the formation of integral roof, windshield frame, cowl and instruments panel parts formed in accordance with this invention;

Fig. 2 is a partial cross-sectional view similar to Fig. 1 but drawn to a larger scale, showing details of the windshield frame and its relationship to the inserted windshield pane;

Fig. 3 is a longitudinal central cross-sectional view similar to Fig. 1, illustrating a modified form of roof construction;

Fig. 4 is a longitudinal central cross-sectional view similar to Fig. 1, showing a still further modified form of roof construction;

Fig. 5 is a partial cross-sectional view similar to Fig. 3, shown in connection with certain parts of the moulding press used to form the modified roof construction;

Fig. 6 is a partial cross-sectional view similar to Fig. 4 shown in connection with a portion of the moulding press used to form the further modified roof construction;

Fig. 7 is a longitudinal central cross-sectional view, similar to Fig. 1, illustrating a modified form of windshield frame and instruments panel construction;

Fig. 8 is a partial cross-sectional view taken along the line VIII—VIII of Fig. 7;

Fig. 9 is a transverse view, partially in cross-section, taken along the line IX—IX of Fig. 7;

Fig. 10 is a cross-sectional view taken along the line X—X of Fig. 8, illustrating a detail of the instrument panel construction;

Fig. 11 is a cross-sectional view along the line XI—XI of Fig. 8 illustrating a further detail of the instrument panel construction;

Fig. 12 is a cross-sectional view along the line XII—XII of Fig. 8 illustrating a still further detail of the instrument panel construction;

Fig. 13 is a partial longitudinal cross-sectional view illustrating a modified windshield frame and instrument panel construction; and Fig. 14 is a partial longitudinal cross-sectional view illustrating a still further modified windshield frame and instrument panel construction.

A preferred form of vehicle body parts constructed in accordance with the principles of this invention is illustrated in Fig. 1, wherein the vehicle roof 1, made of artificial material, is formed integrally with the forward windshield frame 2, connected with the integral cowl 3 and instrument panel 4, and at the rear formed integrally with the window frame 5. Both the forward windshield frame 2 and the rear window frame 5 are preferably formed with integral pane-holding edges indicated at 6 and 8 for the windshield frame 2, and 7 and 9 for the rear window frame 5. The construction of such holding edges is illustrated more clearly in Fig. 2, which shows an enlarged cross-sectional view of the front windshield frame 2. As therein illustrated, the holding edges are divided into two vertically divided parts 6 and 8. The upper portion may be formed substantially flat with the outer surface of the windshield frame 2, while the lower portion 8 will be substantially flat with the interior of the windshield frame. The two holding edges 6 and 8 are preferably divided along a substantially vertical plane A—A for purposes to be hereinafter described. By means of this construction a windshield pane, indicated by the reference numeral 10, can be inserted and firmly held in place with a minimum expense of effort and material. The pane is first inserted as shown at 10' between the opposite upper and lower edge of the respective holding members 6 and 8 and then rotated until it comes within the borders of the frame proper. Holding the pane 10 in place can be accomplished very simply if it is provided with suitable deformable edges, such as a rubber border 11, which can be pressed into place in suitable grooves 12 formed in the upper and lower borders of the windshield frame 2.

The method of forming the windshield frame and inserting the windshield pane, above described, is not only simple and expedient, but is particularly useful in the formation of the integral roof and windshield frame parts as a whole. It is preferable that the moulded parts be formed by a simple press necessitating the use of only vertically acting dies. If the pane-holding edges are formed in the manner described, it will be noted that they do not overlap when viewed in the direction of movement R of the die. They will meet in planes A—A or B—B parallel to the direction of movement so that in this case special tools or re-working is entirely avoided.

A further advantage of the construction shown in Fig. 1 lies in the fact that the supported roof together with its front windshield frame part 2 and its rear window frame 5 is supported at both front and rear along a relatively large cross-sectional area. In the front, this support is formed by the integral cowl 3 and the instrument panel 4, while at the rear the roof is preferably formed with a dependent portion 13 provided with forked supporting arms 14 and 15. The support of the roof structure is thus transferred to points which are under relatively low stress and where any connecting members used can be easily covered and hidden from view.

Another advantage of the construction above described, and which is also present in the form of invention illustrated in Figs. 3 and 4, is that the top portion of the roof is formed integrally with the surrounding border sections, such as the downwardly curved lateral portion 16 (Fig. 1). As contrasted with prior structures, in which the top of the roof is interconnected by some means or another with the surrounding portions, thus resulting in a seam around the edges of the main roof section, this arrangement, because of its integral construction, increases the rigidity of the entire roof structure and prevents the splitting along the seams which is often unavoidably produced due to a poor fit and as a result of strains upon the body. This type of integral construction is perhaps more clearly illustrated in Figs. 3 and 4. In Fig. 3, for example, the roof as a whole is indicated by the reference numeral 21, while the central main portion of the roof is shown at 40. As there illustrated, the roof section 40 is formed integrally with the front and rear portions 41 and 42 respectively, and the lateral depending side wall 16. If a roof structure having a central opening 47, is desired, the front and rear portions 41 and 42 are then formed integrally with the lateral depending side 16.

A simple manner for forming either the closed roof structure illustrated in Fig. 3 or the open roof structure illustrated in Fig. 4 is shown in Figs. 5 and 6. In this case, it is possible to use a single lower die 44 in connection with an upper die 45 having a movable insert 46. If the closed roof structure is to be made, the dies are pressed together in the direction R' with a space between the dies 44 and 46 to form the central roof part 40. In this case, the central roof part 40 has been illustrated as slightly upwardly displaced from the surrounding parts of the roof structure 41, 43 and 16. The purpose of this construction is for making a clean edge between the dies 45 and 46. The slight flash which would otherwise occur between the dies 45 and 46 can accordingly be readily removed along the edges 43 without leaving any trace.

The same dies 45 and 46 can be used to make the centrally open roof structure illustrated in Fig. 4. As shown in Fig. 6, this is done simply by extending the movable die 46 downwardly in the direction R" until it contacts the lower die 44. It will thus be seen that I have provided a simple apparatus which can be utilized for forming a vehicle roof either with a solid top or with a central opening by means of identical apparatus.

It will be obvious to those skilled in this art that the removable insert may occur in the lower die 44 as well as in the upper die 45, or that movable inserts may be utilized in both of these dies.

In Figs. 7 to 14 inclusive has been illustrated modified forms of the windshield frame and instrument panel constructions, all of which can be pressed between simple vertically acting presses and formed integrally with the vehicle roof structure in the same manner as described in connection with Figs. 1 to 6. In one arrangement, generally illustrated in Figs. 7, 8 and 9, the forward part of the vehicle roof 1 is formed with a downwardly extending oblique windshield frame composed of side frame members 62r and 62l and a central U-shaped or hollow column 102. By this arrangement, a place for two windshield panes is formed below each of which are to be found integral instrument boards 104r and 104l. The cowl 63 is mounted integrally along the lower edges 108r and 108l of the windshield frame. Each windshield is preferably formed with integral relatively displaced windshield pane holding edges 66r, 66l, 68r and 68l, as described in connection with Figs. 1 and 2.

The construction of the instrument panel as particularly illustrated in Figs. 7-12 inclusive, is such that a suitable provision is made for the reception of the vehicle indicating instruments, such as gasoline gauge, speedometer, oil gauge, temperature gauge, clock and the like, and also for receptacles such as a glove or map or auxiliary tool compartment, while at the same time permitting the formation of such a board or panel by the use of simple vertically acting dies. For this purpose, the instrument panel is formed in two parts 104r and 104l having respective horizontally extending surfaces 104'r and 104'l which will be positioned beneath their respective windshield openings. Accordingly, the vertically acting dies may project through the windshield openings to form the suitable openings and depressions such as opening 146 and depression 147 in the upper surface of the horizontally extending portion. It will be noted that the horizontally extending portions 104'r and 104'l are formed rigidly and integrally with the lower edges of the respective windshield frame 108r and 108l. To provide the instrument panels with an inner surface which is viewable by the driver of the vehicle and the passengers, such panels are also provided with respective vertically depending portions 104''r and 104''l. The entire instrument panel is strengthened by extensions 142r and 142l of the column 102. The integral extension 142r is integrally connected with the center edges of the panel 104r, while the other integral channel wall is rigidly and integrally connected with the central portion of the instrument panel 104₁. The windshield column 102 may also be provided with a transverse wall 143, thereby forming a closed strong hollow beam. Between the extension 142ᵣ and 142ₗ of the column 102 there will result a space 144 into which radio apparatus may be conveniently installed, if desired. As shown in Figs. 7, 10, 11 and 12, behind the instrument panel and descending vertically from the lower edges 108ᵣ and 108ₗ of the windshield frame there may be provided a transverse strengthening rib 145. This rib may be cut inwardly at substantially the center of the windshield as illustrated in Fig. 12 to provide a space for mounting a windshield wiper.

In Fig. 13 is illustrated a modified type of instrument panel used in connection with a windshield frame extending across the entire width of the vehicle, as illustrated in Figs. 1 to 4 inclusive. In this case, the windshield frame 702 formed integrally with the roof 1 has an instrument panel 704 connected at its lower edge 708 and extending substantially the width of the vehicle. The instrument panel 704 is preferably formed of a substantially vertical depending portion 704', a substantially horizontally extending portion 704" and an upwardly substantially extending portion 704'''. The opening 746''' is provided for mounting the indicating instruments on the face of the panel, while the opening 746' permits the passage of the necessary cables, wires, shafts and the like. If desired, a suitable receptacle 747 provided with cross walls 749 may also be formed. The advantage of this form of construction lies in the fact that the instruments are accessible from the top, which may be covered by a suitable lid. As in the previous types of instrument panels described above, the instrument panel illustrated in Fig. 13 can readily be formed by vertically acting dies extending through the windshield opening and extending upward from below.

If an obliquely extending instrument panel is desired, it may be constructed as illustrated in Fig. 14. In this case, the roof 1 has the windshield frame 802 formed integrally therewith, the lower edge of which 808 is in turn integrally connected with an oblique instrument panel 804. The instrument panel may be provided with formed openings 846 and formed receptacles such as indicated at 847. Here again, the instrument panel may be formed solely by dies acting in the vertical direction.

The type of artificial material which is contemplated for use in the formation of the vehicle roof and its attached part in accordance with this invention, comprehends all types of plastic material and is independent of the particular type chosen. For example, the plastic material may be formed from cellulose, phenol or urea products, and may be homogeneous or laminated with inserts of paper or textile material.

It is also contemplated that many of these features individually described above, may be combined. For example, the open roof structure illustrated in Fig. 4 can readily be used in the form of vehicle roof structure shown in connection with Figs. 7 to 14 inclusive. Likewise, the various types of instrument panels illustrated in Figs. 7 to 14 may be used in connection with the type of vehicle roof shown in Figs. 3 and 4. In all cases where the longitudinally extending type of instrument panel is not used, the windshield frame may be substantially vertical, as well as oblique.

It is also to be understood that the individual parts of artificial material, such as the roof proper, the windshield frame, and the instrument panel may be formed by themselves alone in accordance with the teachings of this invention.

Accordingly, while I have herein shown and described only certain embodiments of certain features of my present invention, it is to be understood that they are to be regarded merely as illustrative, and that I do not intend to limit myself thereto except as may be required by the following claims:

I claim:

1. In and for a vehicle body, an integral one-piece section molded from artificial resinous material forming the vehicle roof, a forward, oblique, downwardly extending windshield frame integral with said roof provided with a windshield opening and having thickened edges of enlarged cross-section along the top and bottom of said opening, each thickened edge provided with a windshield-receiving trough on its side toward the opening.

2. The combination according to claim 1, in combination with an integral extension extending substantially the length of and downwardly from said lowered thickened edge and adapted to form an instrument panel for said vehicle.

3. The combination according to claim 1, in combination with a pair of integral extensions running substantially the length of said lower thickened edge, one of said extensions extending forwardly and being adapted to form a cowl for said vehicle body, the other extension extending downwardly to form an instrument panel for said vehicle.

4. In a vehicle body, a roof of artificial material, and a windshield frame of artificial material formed integrally with said roof, said windshield frame being provided with separate upper and lower integral pane-holding side strips, relatively displaced from one another in a direction transverse to the plane of the windshield.

5. The combination according to claim 4, in which the front edge of the upper pane-holding strips lie in a substantially vertical plane with the rear edge of the lower pane-holding strips.

6. A windshield frame having a pane-receiving opening, and provided with separate upper and lower integral pane-holding side strips, relatively displaced from one another in a direction transverse to the plane of the windshield, the front edge of the upper pane-holding strips lying in a substantially vertical frame with the rear edge of the lower pane-holding strips.

7. In and for a vehicle body, an integral one-piece section molded from artificial resinous material forming an oblique downwardly extending windshield frame, provided with a pair of windshield openings separated by an integral central column in the form of an inverted U, an integral transverse wall closing said U-shaped column beneath the window openings, an integral extension depending from the lower edges of the window openings to form a transverse wall, a pair of further integral extensions each running from the integral transverse wall closing the central column toward the outside of the vehicle along the length of and integral with the lower edge of its respective window opening, to form a pair of instrument panels for said vehicle, and a further integral extension rearwardly from the upper part of said windshield frame and forming a roof for said vehicle.

8. The combination according to claim 7, in which each instrument panel comprises a substantially horizontal portion running along the length and integral with the lower edge of its respective windshield opening, and a substantially vertical depending portion running along and integral with the rear edge of said horizontal portion from the transverse wall of said central column to the outer end of the lower edge of its respective windshield.

9. In and for a vehicle body, an integral one-piece windshield frame molded from artificial resinous material comprising upper and lower members interconnected by obliquely downwardly extending side members surrounding an opening and a central column having the cross-section of an inverted U dividing said opening into two windshield openings, an integral transverse wall closing the lower portion of said column beneath said openings, a depending integral transverse wall running across said frame along the lower edges of said windshield openings, and a pair of integral extensions forming a pair of instrument panels, comprising a horizontal portion extending rearwardly along the length of each windshield opening and an integral vertical portion depending from the rear end of said horizontal portion and extending from the integral transverse column-closing member to the outer end of the lower edge of its respective windshield opening.

10. In a vehicle body, an obliquely downwardly extending windshield frame of artificial material, an integral extension extending rearwardly from the upper portion of said frame to form a roof for said vehicle body, and a further integral extension running along the lower edge of said windshield frame and provided with a portion extending rearwardly between the windshield opening to form an instrument panel for said vehicle.

11. The combination according to claim 10, in which the rearwardly extending portion of said instrument panel lies substantially horizontally.

12. The combination according to claim 10, in which the rearwardly extending portion of said instrument panel extends obliquely downwardly.

13. The combination according to claim 10, in which said instrument panel is provided with vertically formed openings.

14. The combination according to claim 10, in which said instrument panel is provided with vertically formed depressions.

15. The combination according to claim 10, in which the rear edge of said instrument panel is formed with an integral depending portion.

16. The combination according to claim 10, in which the rearwardly extending portion of said instrument panel is connected to the lower edge of said windshield frame by an integral substantially vertically extending portion.

ERWIN KOMENDA.